US008333311B2

(12) United States Patent
Hubbard

(10) Patent No.: US 8,333,311 B2
(45) Date of Patent: Dec. 18, 2012

(54) EXTENDABLE ROOF RACK

(75) Inventor: Peter Douglas Hubbard, Christchurch (NZ)

(73) Assignee: Hubco Automotive Limited, Wellington (NZ)

( * ) Notice: Subject to any disclaimer, the term of this patent is extended or adjusted under 35 U.S.C. 154(b) by 302 days.

(21) Appl. No.: 12/679,434

(22) PCT Filed: Sep. 15, 2008

(86) PCT No.: PCT/NZ2008/000236
§ 371 (c)(1),
(2), (4) Date: Jun. 9, 2010

(87) PCT Pub. No.: WO2009/038480
PCT Pub. Date: Mar. 26, 2009

(65) Prior Publication Data
US 2010/0282799 A1 Nov. 11, 2010

(30) Foreign Application Priority Data
Sep. 21, 2007 (NZ) ........................................ 561811

(51) Int. Cl.
*B60R 9/045* (2006.01)
(52) U.S. Cl. ........................................ 224/320; 224/321
(58) Field of Classification Search .......... 224/320–322, 224/309, 315, 319, 329–331; 403/109.1–109.3
See application file for complete search history.

(56) References Cited

U.S. PATENT DOCUMENTS

| 4,245,764 A | * | 1/1981 | Kowalski et al. ............. 224/321 |
| 4,449,656 A | * | 5/1984 | Wouden ........................ 224/320 |
| 4,684,049 A | * | 8/1987 | Maby et al. .................... 224/329 |
| 4,757,929 A | * | 7/1988 | Nelson ........................... 224/329 |
| 4,778,092 A | * | 10/1988 | Grace ............................ 224/331 |
| 5,456,512 A |   | 10/1995 | Gibbs et al. |

(Continued)

FOREIGN PATENT DOCUMENTS
CN 101559737 A * 10/2009
(Continued)

OTHER PUBLICATIONS

International Preliminary Report on Patentability mailed Mar. 24, 2010 for PCT Application No. PCT/NZ2008/000235.

(Continued)

*Primary Examiner* — Nathan J Newhouse
*Assistant Examiner* — Todd Anderson
(74) *Attorney, Agent, or Firm* — Kolisch Hartwell, PC

(57) ABSTRACT

The invention relates to a flush bar roof rack comprising a pair of legs, each of which includes a housing for holding and supporting a crossbar. The roof rack also includes a crossbar, held and supported at each end by the crossbar housing of each leg, and further includes an extension means for adjusting the length of the roof rack between the legs.

16 Claims, 10 Drawing Sheets

U.S. PATENT DOCUMENTS

| | | | |
|---|---|---|---|
| 5,553,761 A * | 9/1996 | Audoire et al. | 224/321 |
| 5,924,614 A * | 7/1999 | Kuntze et al. | 224/321 |
| 6,273,311 B1 * | 8/2001 | Pedrini | 224/321 |
| 6,279,802 B1 * | 8/2001 | Hickman et al. | 224/321 |
| 6,722,541 B1 * | 4/2004 | Aftanas et al. | 224/403 |
| 6,796,471 B2 * | 9/2004 | Aftanas et al. | 224/321 |
| 6,817,500 B2 * | 11/2004 | Neaux | 224/321 |
| 8,087,557 B2 * | 1/2012 | Larsson et al. | 224/321 |
| 8,104,651 B2 * | 1/2012 | Bingham | 224/315 |
| 2003/0178457 A1 | 9/2003 | Wang | |
| 2004/0118886 A1 * | 6/2004 | Mirshafiee et al. | 224/315 |

FOREIGN PATENT DOCUMENTS

| | | |
|---|---|---|
| CN | 101559738 A * | 10/2009 |
| EP | 0151907 | 8/1985 |
| EP | 0151907 A2 | 8/1985 |
| EP | 1205358 | 5/2002 |
| EP | 1340652 | 9/2003 |
| GB | 1045619 | 10/1966 |
| GB | 1045619 A | 10/1966 |
| GB | 1311367 | 3/1973 |
| GB | 1311367 A | 3/1973 |
| GB | 2277309 | 10/1994 |
| GB | 2277309 A | 10/1994 |
| GB | 2303344 | 2/1997 |
| GB | 2303344 A | 2/1997 |

OTHER PUBLICATIONS

International Search Report dated Jan. 7, 2009 for application No. PCT/NZ2008/000236.

European Patent Office, Extended European Search Report relating to European Patent Application No. 08831692.2 dated Feb. 29, 2012, 6 pages.

* cited by examiner

EXTENDABLE ROOF RACK

FIELD

The instant disclosure relates to a vehicle roof rack or load carrier.

BACKGROUND

Roof racks are well known and are manufactured in a variety of configurations. Typically, roof racks include a crossbar with a leg on each end of the crossbar to support the crossbar and attach the crossbar to the roof of a vehicle. The legs are spaced apart from each other a selected distance. Generally, the distance between the legs is determined by the width of the vehicle to which the roof rack is mounted.

It is known to have roof racks where the ends of the crossbar are held within the legs of the roof rack (that is, the ends of the crossbar do not extend beyond the legs of the roof rack). In this form of roof rack, each end of the crossbar is typically flush with the respective leg of the roof rack supporting that end. Such roof racks are referred to in this specification as "flush bar" roof racks. The length of the crossbar in flush bar roof racks is less than the width of the vehicle to which the roof rack is to be attached.

Different vehicles have roofs of different widths. Therefore, the distance required between the legs of the roof racks will differ depending on the vehicle to which the roof rack will be attached.

However, the length of the crossbar for conventional flush bar roof racks is fixed. This means that a user must purchase a crossbar having a length suited to the roof width of the vehicle to which the roof rack will be attached. This presents a number of disadvantages. In particular, if a user intends to use a flush bar roof rack for more than one type vehicle, where each vehicle roof has a substantially different width, the user will need to purchase a flush bar roof rack specifically for each vehicle.

Furthermore, retailers need to stock different lengths of crossbar for flush bar roof racks to suit different vehicles having roofs of substantially different widths, thereby increasing the stock levels of retailers.

Similarly, a manufacturer needs to manufacture crossbars to different lengths to suit different types of vehicles, thereby increasing production costs.

SUMMARY

The instant disclosure relates to a flush bar roof rack that is of an extendible length. This is achieved by housing and supporting both an extension member and a crossbar within a leg of the roof rack. The extension member and crossbar are adapted so that the extension member can be pushed into the crossbar to form a minimum extension position in which the roof rack is at its minimum length. The extension member can also be partially retracted from the crossbar to form a maximum extension position at the maximum extension point. In this position, the roof rack is at its maximum length. Thus, the extension member acts as an extension of the crossbar and, in a retracted position, it is capable of extending the effective length of the crossbar.

The roof rack of the disclosed herein preferably includes an extension stop to prevent the extension member from retracting beyond the maximum extension point.

In addition, a roof rack extension adjustment and locking mechanism is described herein. The extension adjustment and locking mechanism allows the length of the roof rack to be extended or retracted simply, by moving the extension member longitudinally relative to the crossbar, and then locks the extension member in that extended or retracted position.

In some embodiments, a flush bar roof rack is disclosed. The flush bar roof rack includes a pair of legs, each leg comprising a crossbar housing; and a crossbar held and supported at each end by the crossbar housing of each leg; wherein the roof rack includes an extension means for adjusting the length of the roof rack between the legs.

The extension means preferably includes an extension member having a support with an end face and a contact face. In this embodiment, at least one extension arm projects from the contact face of the support, the extension arm having a first surface and a second surface and being adapted to fit within a cavity in the crossbar, and the end face of the support has a profile that is the same shape and dimensions as the external profile of an end of the crossbar such that the support and the crossbar can be held within the crossbar housing.

Preferably, the extension member includes a first and second extension arm adapted to fit within a first and second cavity, respectively, in the crossbar, the extension arms being in sliding engagement with the respective cavities.

In a preferred embodiment, the roof rack includes a maximum extension stop. Preferably, the extension stop includes a resilient catch located on the extension member for engagement with a locking means, comprising an aperture or recess, located on the crossbar.

The resilient catch may includes a resilient finger from which projects a lug adapted to engage with the locking means. The resilient finger is attached to, or integral with, an extension arm.

Preferably, the lug projects from the first surface of the extension arm.

In a preferred embodiment, the lug includes a forward face, which faces toward the distal end of the extension arm, and a rear face, which faces toward the extension member support. The forward face of the lug is sloped toward the resilient finger.

More preferably, the rear face of the lug is a blunt face.

The crossbar of the roof rack may have an aerodynamic external profile.

In another preferred embodiment, the roof rack includes a roof rack extension adjustment and locking mechanism to lock the roof rack in an extended position.

Preferably, the roof rack extension adjustment and locking mechanism includes an adjustment latch located within a latch housing in an extension arm and a plurality of latch engagement sockets or slots located on the crossbar and aligned to engage with the adjustment latch.

Preferably, the latch housing includes a first portion and a second portion, separated by a partition wall. The first portion of the latch housing is defined by a rear surface nearest the extension member support, a forward surface nearest the distal end of the second extension arm, and two opposing side surfaces. The second portion of the housing includes a pair of opposing bearings and a link retaining means that projects across the second portion of the latch housing at or near the first surface of the extension arm. The partition wall terminates below the link retaining means to form a link supporting end.

Preferably, the link retaining means includes a pair of opposing flanges.

In a preferred embodiment, the adjustment latch includes a link having an L-shaped body including an actuating portion and a locating portion. The actuating portion includes a toggle receiving aperture, or recess. The locating portion is perpendicular to the actuating portion. The adjustment latch further includes a toggle comprising a body having a base and a central axle. A shaft projects from the base. An engaging foot projects from the opposite side of the body to the shaft. In addition, the adjustment latch includes a biasing means having a first end and a second end. The latch is housed in the latch housing so that the actuating portion of the link is positioned between the supporting end of the partition wall and the link retaining means. The toggle receiving aperture, or recess, in the actuating portion is positioned within the second portion of the latch housing. The link is positioned in the latch housing so that the locating portion projects toward the second surface of the extension arm. The toggle is positioned in the second portion of the latch housing. The toggle shaft engages with the toggle receiving aperture, or recess, on the actuating portion, and the toggle axle is supported by the opposing bearings in the second portion of the latch housing. The biasing means is positioned in the first portion of the latch housing, the first end of the biasing means being operatively engaged with the locating portion to push the locating portion against the rear surface of the first portion of the latch housing. The second end of the biasing means pushes against the partition wall.

Preferably, the biasing means is a compressed spring.

Preferably, the roof rack includes a latch release mechanism that is in operative engagement with the adjustment latch to disengage the adjustment latch from the latch engagement sockets.

The latch release mechanism may include a button in operative engagement with a shank, the shank being in operative engagement with the locating portion of the link to push the link toward the distal end of the extension arm.

Preferably, the locating portion of the link includes a shank receiving aperture having a threaded annular surface. In this embodiment, the shank has a threaded end that interlocks with the threaded annular surface of the shank receiving aperture. The first end of the spring is held in position against the locating portion of the link by the shank.

Preferably, the roof rack includes a coupling means to hold the crossbar to the leg. The coupling means may include a peg receiving aperture formed in the inboard end of the crossbar housing; a channel formed in the lower surface of the crossbar and aligning with the peg receiving aperture; and a peg. The peg has a shaft that is dimensioned to engage with the channel and peg receiving aperture when the peg is in a first position and to disengage with the channel and peg receiving aperture when the peg is in a second position.

Preferably, a leg cover is attached to each leg of the roof rack. The leg cover may include a body having an upper portion from which projects a roof. The roof includes a first surface and a second surface. A pair of rails project from the second surface of the roof to engage with a longitudinal channel within a crossbar.

Preferably, the roof includes sides profiled to slide against the opposing lips of the leg when the leg cover is being attached to the leg.

Preferably, the leg cover has an inner face from which projects a locating guide.

The cover may include one or more braces for supporting a tool to be housed within the cover.

In another aspect, an extension member for a roof rack is disclosed. The extension member includes a support with an end face and a contact face; wherein at least one extension arm projects from the contact face of the support, the extension arm having a first surface and a second surface, and being adapted to fit within a cavity in the crossbar; and wherein the end face of the support has a profile that is the same shape and dimensions as the external profile of an end of a roof rack crossbar, so that both the support and the crossbar can be held within a crossbar housing on a leg of a roof rack.

The term "roof rack" as used herein should be interpreted to include the similar term "load carrier".

Similarly, the term "crossbar" is to be interpreted broadly to include a roof rail or any load carrying apparatus configured to be releasably clamped or attached to a roof rack leg.

The term "relevant vehicle" means the vehicle to which a user intends to attach a roof rack.

The term "effective length of the crossbar" refers to the length of the crossbar between the legs of the roof rack.

The term "comprising" as used in this specification and claims should be interpreted to mean "consisting at least in part of" or "comprising". That is, when interpreting independent claims comprising that term, the features prefaced by that term in each claim all need to be present but other features can also be present. Variants, such as "comprised" and "comprises" are to be interpreted in the same manner.

BRIEF DESCRIPTION OF THE DRAWINGS

Further features of the instant disclosure will become apparent from the following description which is given by way of example only and with reference to the accompanying drawings in which:

FIG. 4b is a perspective view of a second side of the crossbar extension member shown in FIG. 3a;

DETAILED DESCRIPTION

The instant disclosure relates to a flush bar roof rack that is of an extendible length.

Figure 1:
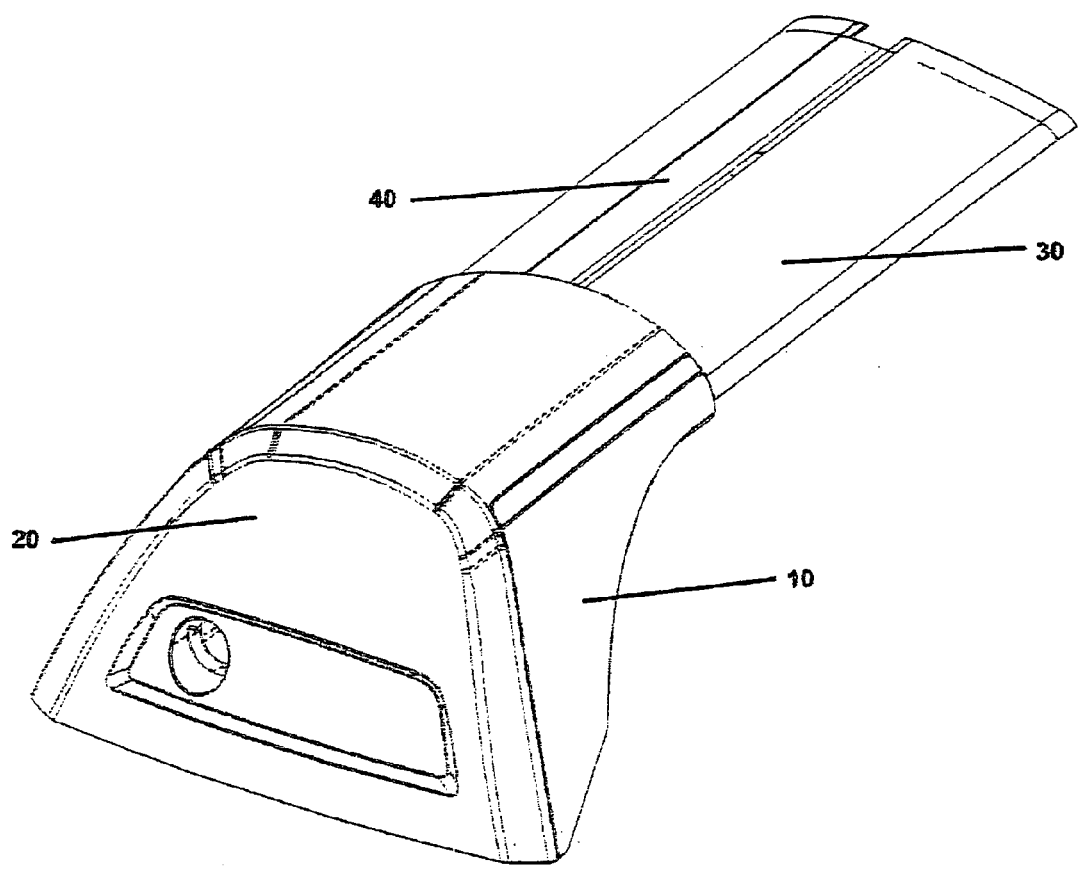
FIG. 1 is a perspective view of a portion of a flush bar roof rack according to embodiments described herein.

FIG. 1 shows a perspective view of the left hand portion (when viewed from the rear of the relevant vehicle and looking toward the front of the vehicle) of an assembled flush bar roof rack according to some embodiments described herein.

The components of the assembled roof rack that can readily be seen in FIG. 1 are: the leg 10, to which is attached a leg cover 20; and a crossbar 30, within which is positioned a resilient infill 40, the crossbar being housed within the leg.

Figure 2:
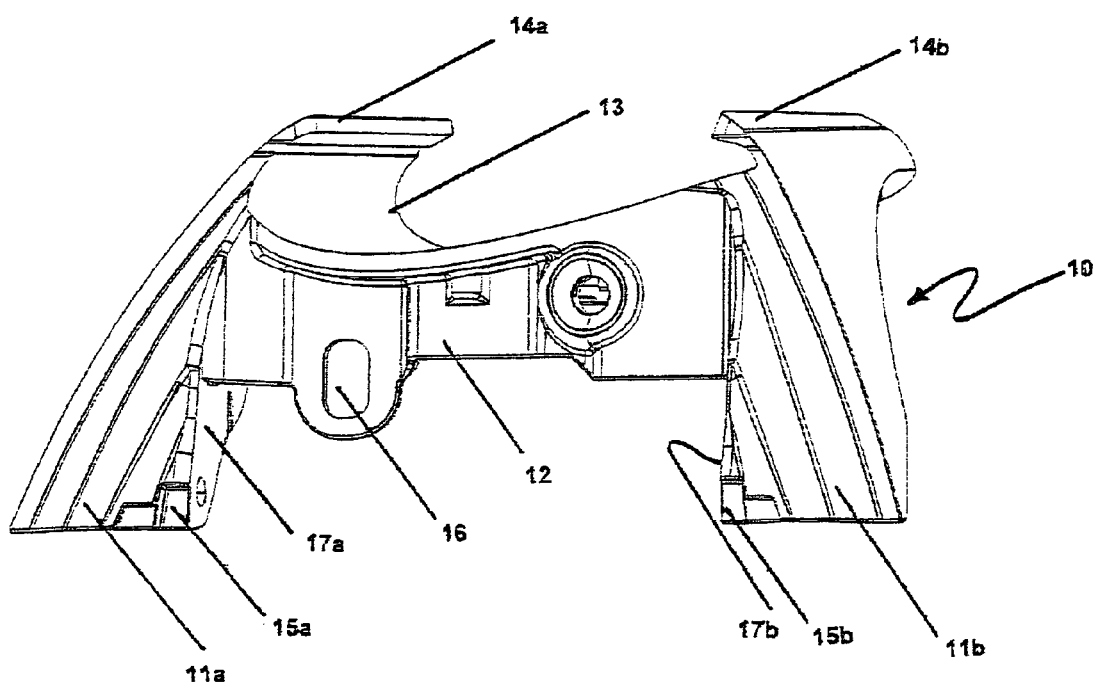
FIG. 2 is a perspective view of a leg for a roof rack according to embodiments described herein.

As shown in FIG. 2, the leg 10 of the roof rack includes a base having a pair of supports 11a, 11b with a bridge 12 in between. A crossbar housing 13 is positioned above the bridge. The crossbar housing 13 is shaped to allow for a crossbar having an aerodynamic end profile (such as the crossbar shown in FIG. 4) to be slid into the housing 13. The crossbar housing 13 holds and supports the crossbar and secures the crossbar to the leg 10.

Although the form of crossbar housing shown in FIG. 2 is shaped to hold and support a crossbar with an aerodynamic end profile, it is envisaged that the crossbar housing could be shaped to house and support a crossbar having a different transverse cross-sectional profile.

Furthermore, it is not essential for the leg to includes a bridge. It is envisaged that instead of the leg including a bridge, the base of the leg may have a continuous bottom edge.

Overhanging lips 14a and 14b are located at the top of the crossbar housing and act to prevent the crossbar from pulling upward out of the housing 13 when upward force is applied to the crossbar.

The overhanging lips define an opening giving access to a longitudinal channel running along the length of the crossbar. The opening and channel allow for equipment brackets (also known as accessory clamps) to be attached to the crossbar at one end, and slid along the channel of the crossbar between the lips of the crossbar housing. The equipment brackets are suitable for holding kayaks, bicycles, or the like to the roof rack. Suitable forms of equipment brackets are described in the applicant's New Zealand patent application no. 551764.

Figure 3:
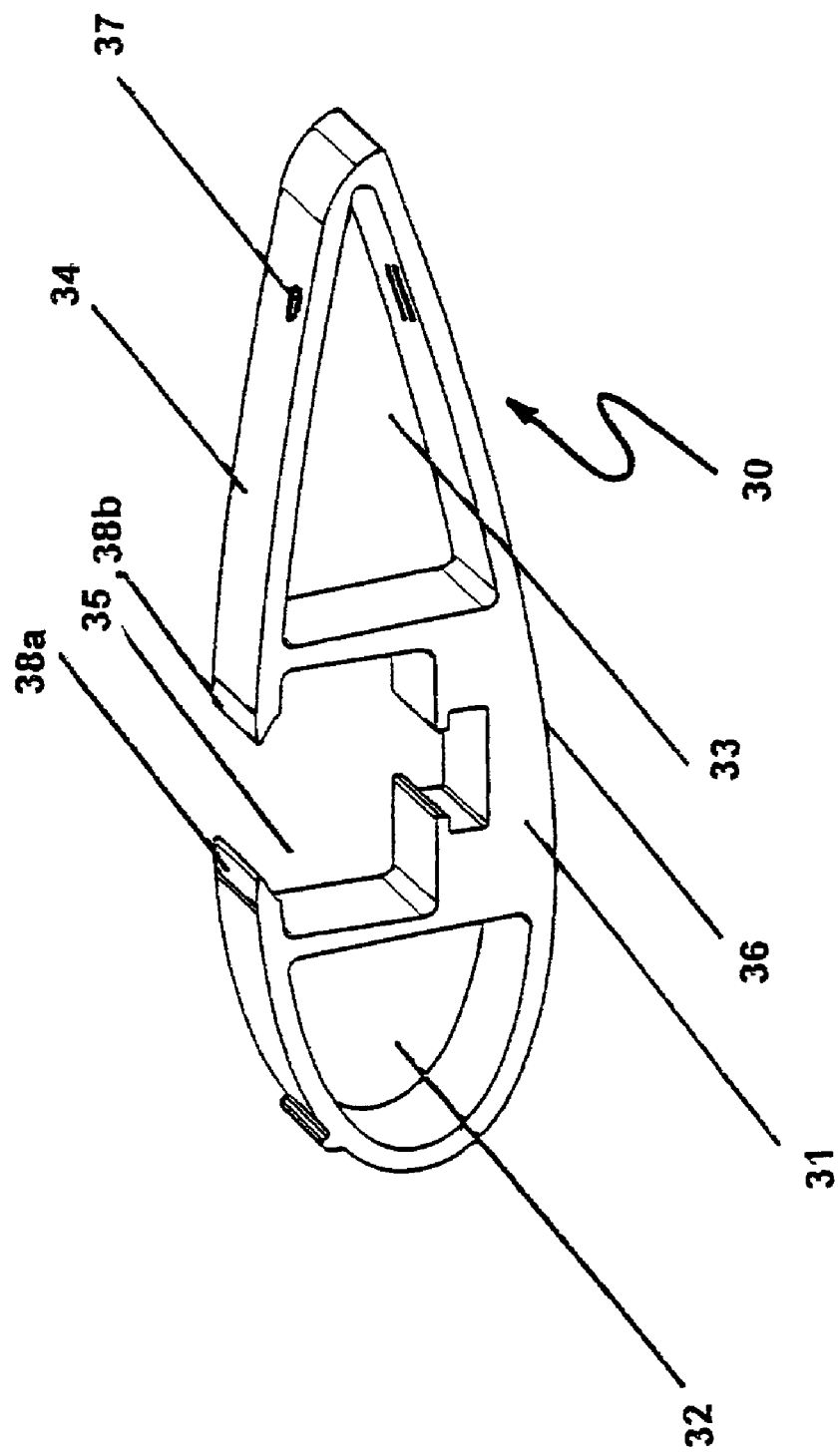
FIG. 3 is a perspective end view of a crossbar according to embodiments described herein.

One form of crossbar for a roof rack described herein is shown in FIG. 3. The crossbar 30 has an aerodynamic external transverse cross-sectional profile. This profile can readily be seen by viewing the crossbar from one end.

The interior of the crossbar is separated into three different portions: a core 31, a first cavity 32, and a second cavity 33. An infill channel 35, for receiving a resilient infill 40, is positioned in the core 31 and between the first and second cavities 32, 33. A pair of opposing lips 38a, 38b project across the infill channel, at the upper surface 34 of the crossbar.

To allow for the effective length of the roof rack to be varied, the crossbar is adapted to mate with an extension means.

Figure 4B:
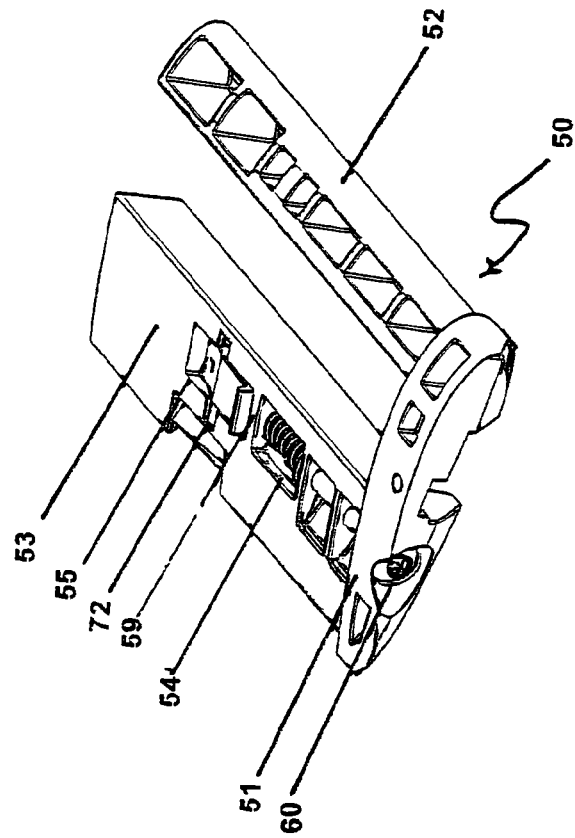
Figure 4A:
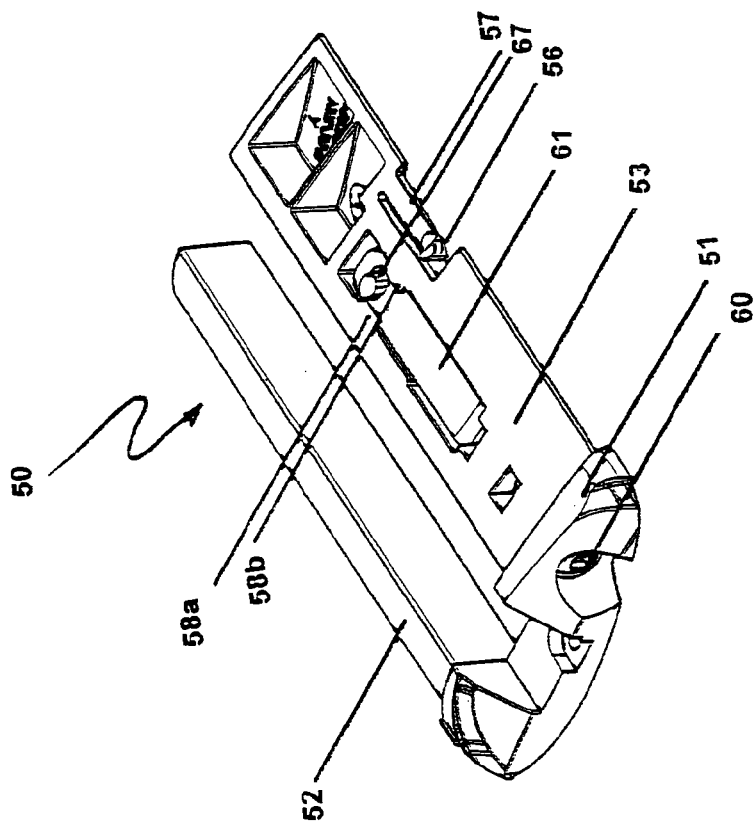
FIG. 4a is a perspective view of a first side of a crossbar extension member according to embodiments described herein.
Figure 4C:
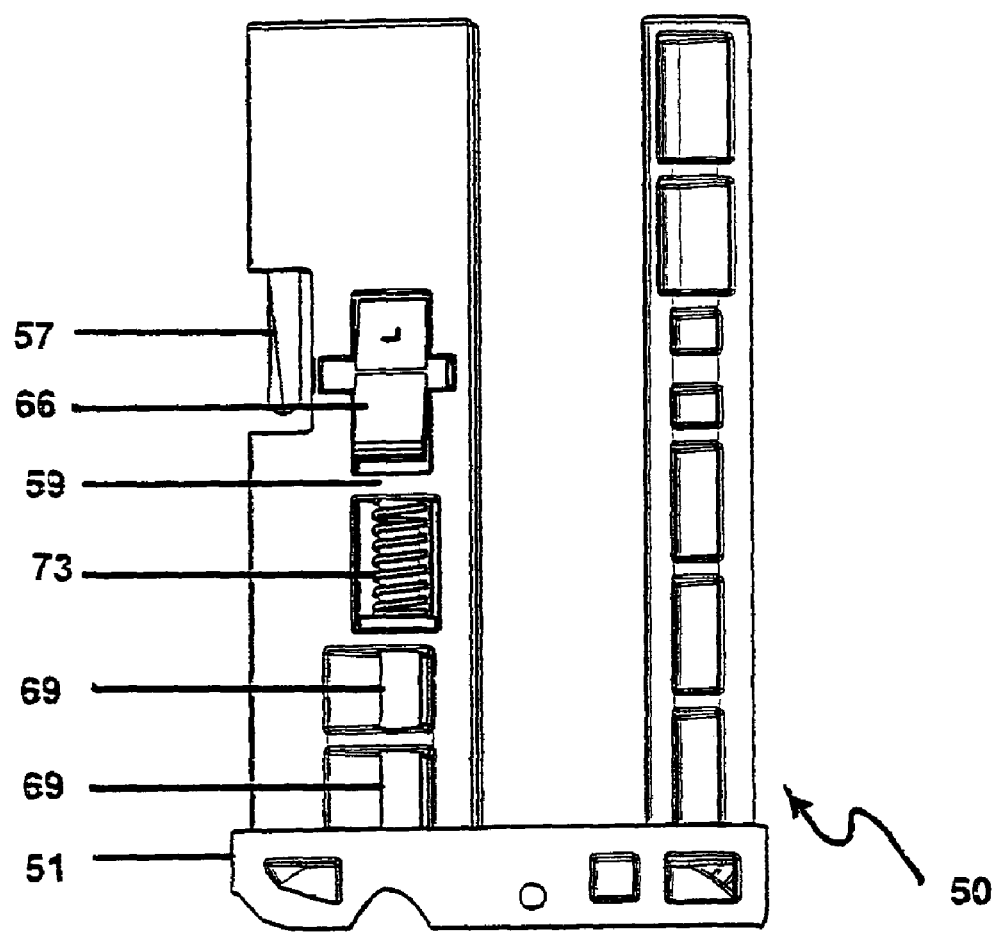
FIG. 4c is a plan view of the second side of the crossbar extension member shown in FIGS. 3a and 3b.

FIGS. 4a to 4c show a crossbar extension means in the form of an extension member 50. The extension member 50 includes a support 51 having an end face and a contacting face. First and second extension arms 52, 53 project from the contacting face of the support 51. The first and second extension arms 52, 53 have opposing inner faces that define a channel in between.

The first and second extension arms 52, 53 are adapted to engage with a crossbar to extend the effective length of the crossbar, thereby extending the length of the roof rack.

The first and second extension arms 52, 53 each have a peripheral external surface that substantially corresponds with the inner surfaces of the first and second cavities 32, 33 in the crossbar respectively, so that the extension arms substantially mate with and fill the first and second cavities.

To attach the extension member 50 to one end of the crossbar 30, the first and second extension arms 52, 53 are slid into the first and second cavities 32, 33 of the crossbar respectively. The core 31 of the crossbar 30, including the infill channel 35, is positioned within the channel of the extension member 50. The extension arms 52, 53 can be pushed into the crossbar 30 until the contacting face of the support 51 abuts the end of the crossbar 30, thereby preventing the entire extension member 50 from sliding within the crossbar 30.

The extension member support 51 supports the extension arms 52, 53 and acts as a stop to prevent the entire extension member 50 from being slid within the crossbar 30.

Each extension arm should fit snugly within its respective cavity to prevent the arm from skewing relative to the cavity and to allow a crossbar extension mechanism to engage with both the crossbar extension member and the crossbar. However, the fit should not be so tight as to prevent the extension arms from sliding longitudinally within the cavities.

Thus, to decrease the effective length of the crossbar, the extension member is pushed into the crossbar, by pushing the extension arms 52, 53 more deeply into the respective cavities 32, 33. To extend the effective length of the crossbar, the extension member is retracted from the crossbar, by partially retracting the extension arms 52, 53 from the cavities 32, 33, extends the effective length of the crossbar.

To allow the extension member and crossbar to be properly held together in a roof rack described herein, the crossbar and extension member are snugly housed within a respective leg of the roof rack.

To easily allow the extension member to be housed within a leg of the roof rack, the end face of the extension member support 51 has an external profile that is substantially the same size and shape as the external end profile of the crossbar 30 (that profile being viewed from an end of the crossbar).

Because the size and shape of the profile of the end face of the extension member support 51 is substantially the same size as the external end profile of the crossbar 30, the extension member is snugly housed within the crossbar housing 13 in the same way in which the crossbar 30 is housed within the housing 13.

Both the extension member support 51 and crossbar 30 can be slid along the crossbar housing 13 in the longitudinal direction of the assembled roof rack, but the crossbar housing 13 prevents substantial sideways (or lateral) movement of the crossbar 30 and support 51 within the housing 13.

Once the extension member 50 is fitted within the crossbar 30 and housed within the crossbar housing 13, the extension member 50 acts as an extension of the crossbar 30.

The roof rack has a maximum extension and a minimum extension. The minimum extension is achieved by pushing the extension member into the end of the crossbar as far as possible until the contacting face of the extension member support abuts the end of the crossbar.

The maximum extension is achieved by retracting the extension member from the crossbar to a maximum extension point. A sufficient portion of the extension member should remain within the crossbar to provide sufficient strength to the union of the extension member and the crossbar so that the crossbar does not skew relative to the extension member, and so that the extensions arms of the extension member cannot readily separate from the crossbar without the assistance of a user. Therefore, it is preferable to control the maximum distance that the extension member can be retracted from the crossbar, so that a user does not inadvertently retract the extension member beyond the maximum extension point. In a preferred form, the roof rack provides this control by providing an extension stop at the maximum extension point.

The extension stop includes a lug 56 for engaging with a corresponding locking means, in the form of an aperture or recess 37, on the crossbar 30, as shown in FIG. 3.

Returning to FIG. 4a, the lug 56 projects from and is attached to, or integral with a resilient finger 57 that is in turn attached to, or integral with, an extension arm. In the embodiment shown in FIG. 4a, the resilient finger 57 is integral with the second extension arm 53. However, it is envisaged that the resilient finger and lug could, alternatively, be positioned on the first extension arm to align with a corresponding locking means on the crossbar as would be readily apparent to a person skilled in the art.

The resilient finger 57 lies in the same plane as the upper surface of the second extension arm 53. However, it is envisaged that the resilient finger may be positioned at a point that is below the height of the upper surface of the extension arm provided that the lug can project from the upper surface of the extension member when the resilient finger'is in its locking position.

The resilient finger 57 is biased to its locking position. That is, in the embodiment shown in FIG. 4a, the resilient finger 57 is in its locking position when it lies in the same plane as the upper surface of the second extension arm, such that the lug 56 projects above the upper surface of the second extension arm.

The resilient finger 57 is able to bend in a direction perpendicular to the upper surface of the second extension arm 53, when force is applied to the finger 57 in such a direction. However, because the finger 57 is resilient and is substantially biased toward its locking position, when force is removed from the finger, the finger substantially returns to its locking position.

The arrangement of lug 56 and resilient finger 57 includes a resilient catch.

The lug 56 has a forward face and an opposing rear face. The forward face faces toward the distal end of the extension member 50 and the rear face faces toward the extension member support 51. The forward face is sloped toward the resilient finger 57, whilst the rear face is a substantially blunt face perpendicular to the resilient finger 57.

The operation of the resilient catch will now be described.

When the second extension arm 53 is positioned within the second cavity 33 of the crossbar 3D, the upper surface of the cavity 33 contacts the upper surface of the second extension arm 53, or is at least in close proximity to the upper surface of the extension arm 53. The sloping forward face of the lug 56 helps the lug to slide against the upper surface of the cavity 33 when the extension arm 53 is being pushed into the crossbar 30.

Because the resilient catch is biased toward its locking position, in which the lug projects above the upper surface of the extension arm, the upper surface of the second cavity 33 contacts the lug 56 and presses down on the lug.

Each end of the crossbar 30 includes a locking means in the form of a locking aperture 37 extending through the upper surface of the second cavity 33 to the upper surface 34 of the crossbar 30, as shown in FIG. 3. The locking aperture 37 is sized to receive the lug 56 and is positioned on the crossbar 30 to align with the lug 56. Therefore, when the extension member 50 is positioned in the crossbar at the maximum extension point, the lug 56 engages with (or mates with) the locking aperture 37.

In particular, when the lug 56 is aligned with the locking aperture 37, the lug is not subject to downward force from the upper surface of the second cavity 33. Therefore, the resilient catch returns to its locking position, in which the lug 56 projects above the upper surface of the extension arm and engages with the locking aperture 37 by substantially protruding through the aperture 37.

If a user attempts to retract the extension member 50 beyond the maximum extension point, the blunt rear face of the resilient lug 56 will abut the inner annular surface of the locking aperture 37 and prevent the extension member 50 from being retracted further from the crossbar 30. In this way, the extension stop prevents the extension member from being retracted beyond the maximum extension point.

A user can only retract the extension member 50 completely from the crossbar 30, if the user pushes down on the lug 56, so that the lug 56 disengages with the locking aperture 37, whilst simultaneously pulling the extension member 50 away from the crossbar 30.

Although the resilient catch has been described as being located on the upper surface of the second extension arm, it is envisaged that the catch could, alternatively, be located on the lower surface of the second extension arm, or on either the upper or lower surface of the first extension arm, as would be readily apparent to a person skilled in the art. Of course, the crossbar would need to have a locking means in a suitable position to align with the lug so that engagement between the lug and locking means prevents the extension member from retracting beyond the maximum extension point.

It is also envisaged that the locking aperture may instead be a locking recess formed in an appropriate inner surface of the crossbar, so that the resilient catch engages with the recess when the extension member is retracted from the crossbar to the maximum extension point.

In addition to the features already described, the instant disclosure provides a roof rack extension adjustment and locking mechanism. The extension adjustment and locking mechanism allows the effective length of the roof rack to be easily adjusted and allows the extension member to be locked to the crossbar in an extended or retracted position.

The roof rack extension adjustment and locking mechanism includes an adjustment latch located on the extension member; and a plurality of latch engagement sockets in the form of apertures, recesses, or slots, located on the crossbar. The adjustment latch is adapted to mate with the engagement sockets.

In the embodiment shown in FIGS. 4b and 4c, the extension adjustment and locking mechanism is positioned on the second extension arm. In particular, the second extension arm 53 includes an aperture, which houses the adjustment latch. The latch housing has a partition wall 59 that separates the housing into a first portion 54 and a second portion 55.

The first portion 54 of the latch housing is defined by a rear surface nearest the extension member support 51, a forward surface, nearest the distal end of the second extension arm 53. Two opposing side surfaces join with the forward and rear surfaces.

A link retaining means in the form of opposing flanges 58a, 58b projects across the second portion 55 of the latch housing at or near the upper surface of the second extension arm 53. The partition wall 59 extends from the floor of the latch housing and terminates below the upper surface of the second extension arm and below the flanges 58a, 58b so that the end of the partition wall forms a supporting end for a link 61, as will be described below.

The adjustment latch includes a link 61; a toggle 66 and a spring, or other biasing means. A latch release mechanism is in operative engagement with the adjustment latch and includes a button 60 connected to, integral with, or in operative engagement with, a shank 69. The adjustment latch is biased to an engaging position.

In a preferred form, the shank 69 and button 60 include the shaft and head of a screw respectively.

Figure 5:
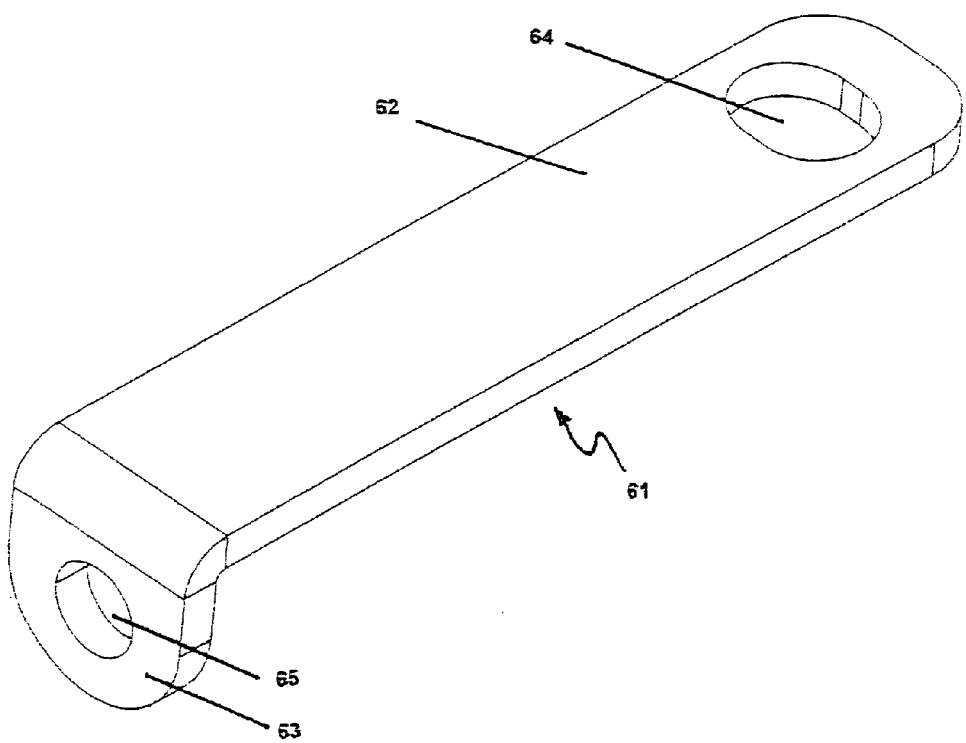
FIG. 5 is a perspective view of a link for an adjustment latch according to embodiments described herein.

Referring now to the embodiment shown in FIG. 5, the link 61 has an L-shaped body including an actuating portion 62 and a locating portion 63. A toggle receiving means in the form of an aperture, or recess, 64 is located on the actuating portion 62 and allows the toggle to engage with the link.

The locating portion 63 of the link is substantially perpendicular to the actuating portion 62. The locating portion 63 may include a shank receiving aperture 65, which may have a threaded annular surface.

In the embodiment shown in FIGS. 4a to 4c, the link 61 is positioned within the latch housing so that the actuating portion 62 is positioned between the supporting end surface of the partition wall 59 and below the opposing flanges 58a, 58b.

Thus, the end surface of the partition wall 59 the opposing flanges 58a, 58b serve as link retaining means to help confine the link within the latch housing.

The link is arranged in the latch housing such that the locating portion 63 of the link projects toward the opposing (lower) surface of the second extension arm 53 and is positioned in the first portion 54 of the latch housing and the toggle receiving means, shown in the form of an aperture 64, is positioned within the second portion 55 of the latch housing, as shown in FIG. 4a.

The link acts as part of an actuating mechanism (including the link, the latch release mechanism and biasing means), to cause the toggle to engage with the engagement slots on the crossbar.

Figure 6:
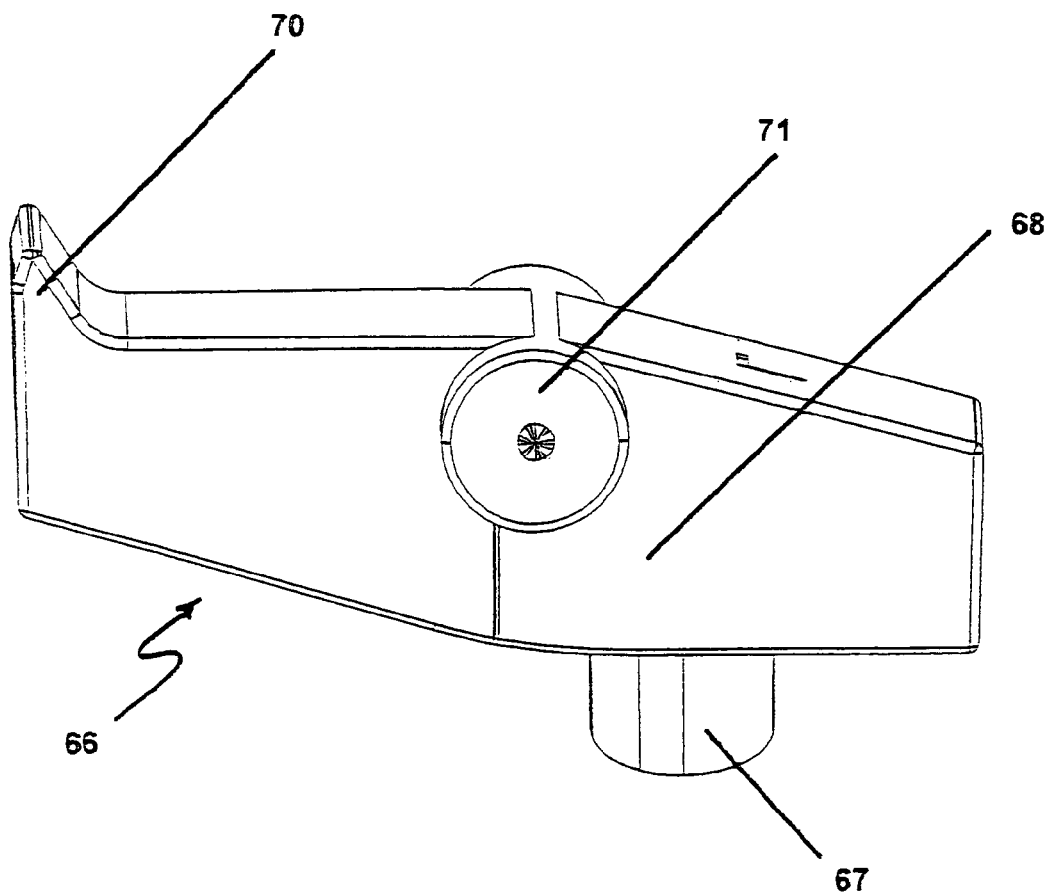
FIG. 6 is a perspective view of a toggle for an adjustment latch according to embodiments described herein.

The toggle 66, shown in FIG. 6, includes a body 68. The body 68 has a base and a locking end. An axle 71 is located at the centre of the body. A shaft 67 projects from the base of the body 68 and an engaging foot 70 extends from the locking end of the body 68 on the opposite side of the body to the shaft 67.

Returning to FIGS. 4b and 4c, the second portion 55 of the latch housing includes opposing bearing surfaces 72 adapted to accommodate the axle 71 of the toggle 66 and allow the axle 71 to rotate within the bearing surfaces 72.

The toggle 66 is positioned within the second portion 55 of the latch housing so that the shaft 67 projects into the toggle receiving aperture 64 in the link 61 and the axle 71 sits within the axle bearings 72.

A compressed spring 73, or other biasing means, is contained in the first portion 54 of the latch housing, one end of the spring 73 being held against the forward surface of the first portion 54 of the latch housing and the other end of the spring being held against the locating portion 63 of the link 61. The compressed spring pushes against the locating portion 63 of the link, pushing the locating portion 63 against the rear surface of the first portion 54 of the housing when the adjustment latch is in its engaging position.

A latch release button 60 is positioned within a button aperture in the extension member support 50. The latch release button 60 cooperates with a shank 69 that is in operative engagement with the locating portion 63 of the link 61. In a preferred form, the button 60 is integral with a threaded shank 69 that interlocks with a threaded shank receiving aperture 65 in the locating portion 63 of the link 61. The threaded shank 69 may extend through the shank receiving aperture 65 and act as a pin to hold one end of the spring 73 against the locating portion 63 of the link, thereby helping to hold the biasing means in position.

It is envisaged that the latch release button 60 may only engage with the shank 69 when the button 60 is depressed, the button and shank, in this form, being separate parts of the adjustment latch. Additionally, or alternatively, the shank 69 may engage with the locating portion of the link 61 by being integral with the locating portion, or by abutting the rear face of the locating portion (the rear face facing the extension member support). In this form, the locating portion will not require a shank receiving aperture.

The adjustment latch is biased toward its engaging position. In this position, the compressed spring 73 pushes against the locating portion 63 of the link 61 so that the rear face of the locating portion 63 contacts the rear face of the first portion 54 of the housing. The base of the toggle 66 rests on the actuating portion 62 of the link 61, and the engaging foot 70 projects from the lower surface of the second extension arm 53.

The engaging foot 70 has a sloped forward face, which faces toward the distal end of the extension member 50, and a blunt rear face, which faces toward the extension member support 51.

If force is applied to the engaging foot 70 so as to push the foot 70 into the second portion 55 of the latch housing, the toggle 66 is caused to pivot about its axle 71, causing the toggle shaft 67 to move toward the distal end of the extension arm. Because the toggle shaft 67 is engaged with the toggle receiving means 64, in the link 61, the link 61 is also caused to move toward the distal end of the extension arm. As the link moves toward the distal end of the extension arm, the locating portion of the link presses against the spring, compressing the spring further.

When the force is removed from the foot 70, the compression force on the spring is partially released and the latch and latch components return to the engaging position such that the engaging foot 70 again projects above the lower surface of the second extension arm 53.

As mentioned above, the crossbar has a plurality of latch engagement sockets in the form of recesses, apertures, or slots near each end. The slots are aligned on the crossbar so as to engage with the engaging foot of the adjustment latch when the extension arm is positioned within the crossbar.

In the embodiment where the adjustment latch is located on the second extension arm and the engaging foot projects from the lower surface of the second extension arm, each end of the crossbar includes a plurality of latch engagement sockets in the floor of the second cavity, as shown in FIG. 3. In the preferred form, the latch engagement sockets are in the form of slots.

The latch engagement sockets are positioned on the crossbar at specific points so that the length of the crossbar can be adjusted to suit the roof widths of the most common vehicles.

The use of the roof rack extension adjustment and locking mechanism will now be described.

When the extension member shown in FIGS. 4a to 4c is pushed into a crossbar like that shown in FIG. 3, the first and second extension arms of the extension member are pushed into the respective cavities in the crossbar. This causes the floor of the second cavity 33 to contact the engaging foot 70 that projects from the lower surface of the second extension arm. The snug fit between the second extension arm 53 (that houses the adjustment and locking mechanism) and the surfaces of the cavity 33 causes the floor of the cavity 33 to push against the engaging foot 70, substantially pushing the foot into the latch housing.

The extension member is pushed into the end of the crossbar until the engaging foot engages with a slot (latch engagement socket) on the crossbar. If the user requires the length of the roof rack to be shorter, the user can push the extension member further into the crossbar until the foot engages with a slot that locks the crossbar at the desired length.

As the user pushes the extension member further into the crossbar, the sloping forward face of the foot 70 contacts the forward edge of the slot through which the foot projects. As the sloping face of the foot 70 is pushed against the edge of the slot, the foot 70 is gradually pushed into the latch housing, thereby disengaging the foot from the slot and allowing the extension member 50 to penetrate further into the crossbar 30.

Figure 7:
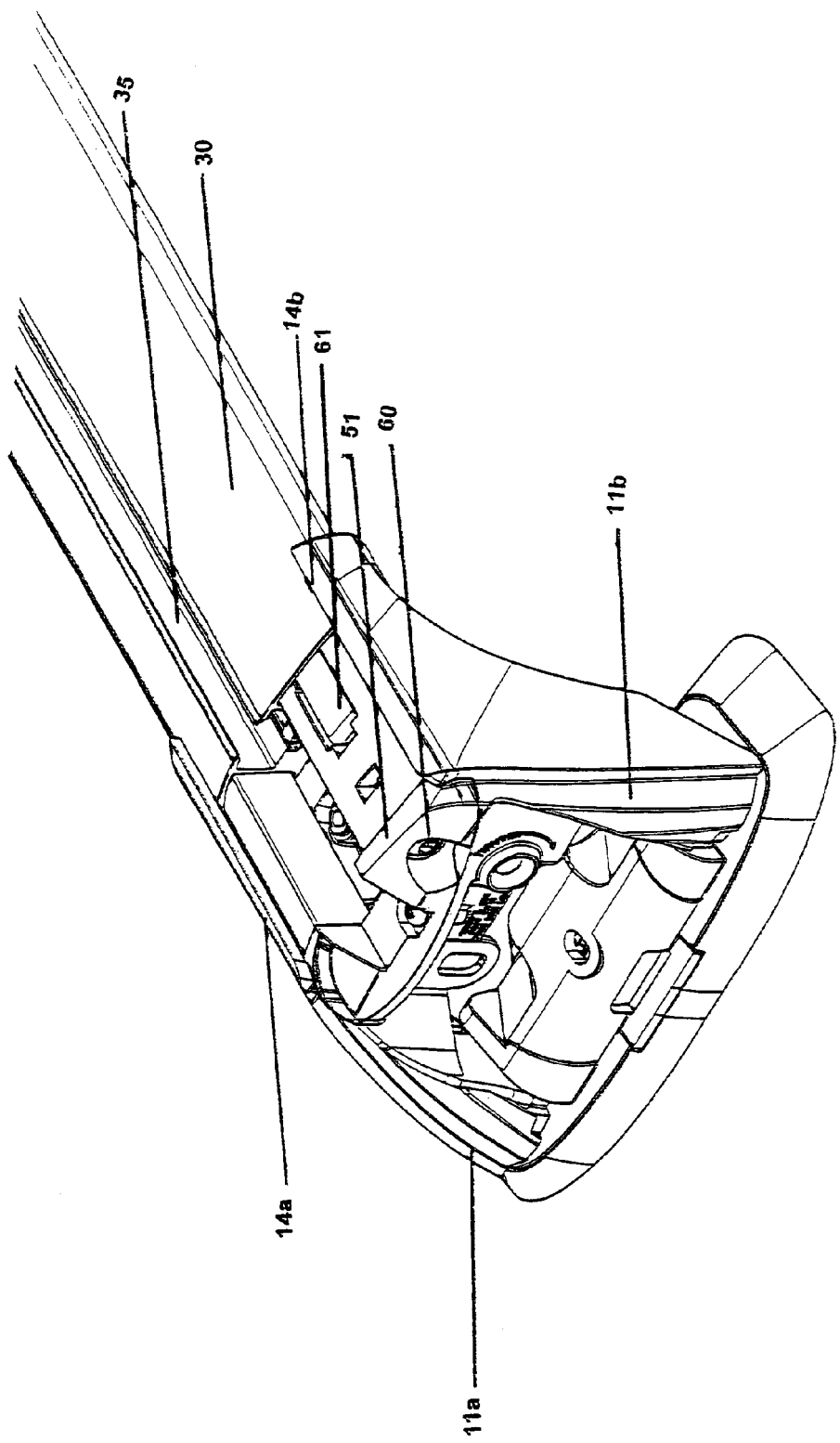
FIG. 7 is a perspective view of a portion of the roof rack according to embodiments described herein, showing the roof rack in an extended position.

FIG. 7 shows the extension member positioned within the crossbar and housed in the crossbar housing.

When a user attempts to retract the extension member from the crossbar, the blunt rear face of the engaging foot 70 is caused to abut the rear edge of the slot with which the foot is engaged. Because the blunt rear face of the foot is not sloped, the foot jams against the rear edge of the slot, preventing the extension member from being retracted from the crossbar. The extension member is, thereby, locked in position relative to the crossbar.

Therefore, to retract the extension member from the crossbar, a latch release mechanism is used. As described above, the latch release mechanism is in the form of a latch release button 60 in operative engagement with a shank 69, which is in turn in operative engagement with the adjustment latch. However, other latch release mechanisms may alternatively be used, as would be readily apparent to a person skilled in the art.

By depressing the latch release button 60, the shank 69 is pushed toward the toggle 66. Because the shank 69 is also operatively engaged with the locating portion 63 of the link 61, the shank drives the link 61, and hence the toggle receiving means 64, toward the toggle 66 (or toward the distal end of the extension member). The shaft 67 of the toggle 66 is engaged with the toggle receiving means and is, therefore, caused to move in the same direction.

The movement of the shaft 67 of the toggle 66 causes the toggle to pivot about its axle 71 such that the engaging foot 70 withdraws into the second portion 55 of the latch housing. When the engaging foot 70 withdraws into the latch housing, the foot disengages with the latch adjustment socket on the crossbar and the extension member can be retracted from the crossbar.

Where the button 60 and shank 69 include a screw, the screw projects through the shank receiving aperture 65 in the link 61. The shank receiving aperture 65 has a threaded interior to engage with the screw. The screw is loosened (preferably using an alien key held within the leg cover of the roof rack) by the user and pushed toward the spring 73, causing the toggle 66 to pivot and to disengage the engaging foot 70 from a latch adjustment socket. When the crossbar reaches the appropriate extension position, the user releases the pressure on the screw head 60 so that the engaging foot engages with the appropriate latch adjustment socket. The screw is then tightened again to hold the toggle 66 in place in the engaging position. As a safety measure, the inside face of the leg cover includes a small projection which prevents the cover from being attached to the leg if the screw 60 is not tight enough.

In effect, the crossbar extension adjustment and locking mechanism allows the extension member to be pushed into the crossbar and locked in position, but the extension member cannot be retracted from the crossbar without depressing the latch release button.

The compressed spring creates a resilient latch so that when the latch release button 60 is released, thereby reducing the compression on the spring, the adjustment latch resumes its engaging position and the engaging foot again projects from the extension arm ready to engage with a latch adjustment socket in the crossbar.

As a safety precaution, the maximum extension stop is preferably positioned on the extension member and crossbar to prevent a user from retracting the extension member beyond the latch adjustment socket that defines the maximum extension for the crossbar.

One problem that arises when the effective length of the crossbar 30 is extended by partially retracting the extension member 50 from the crossbar 30, is that the extension member bears much of the downward force from the load of the roof rack. This downward force on the extension member creates a turning moment on the leg and encourages the inboard end of the leg to pivot toward the roof of the vehicle (the inboard end is the end of the leg that faces toward the opposing leg of the roof rack). It is undesirable for the leg to pivot toward the roof of the vehicle as this creates a less stable union between the leg and crossbar.

Figure 8:
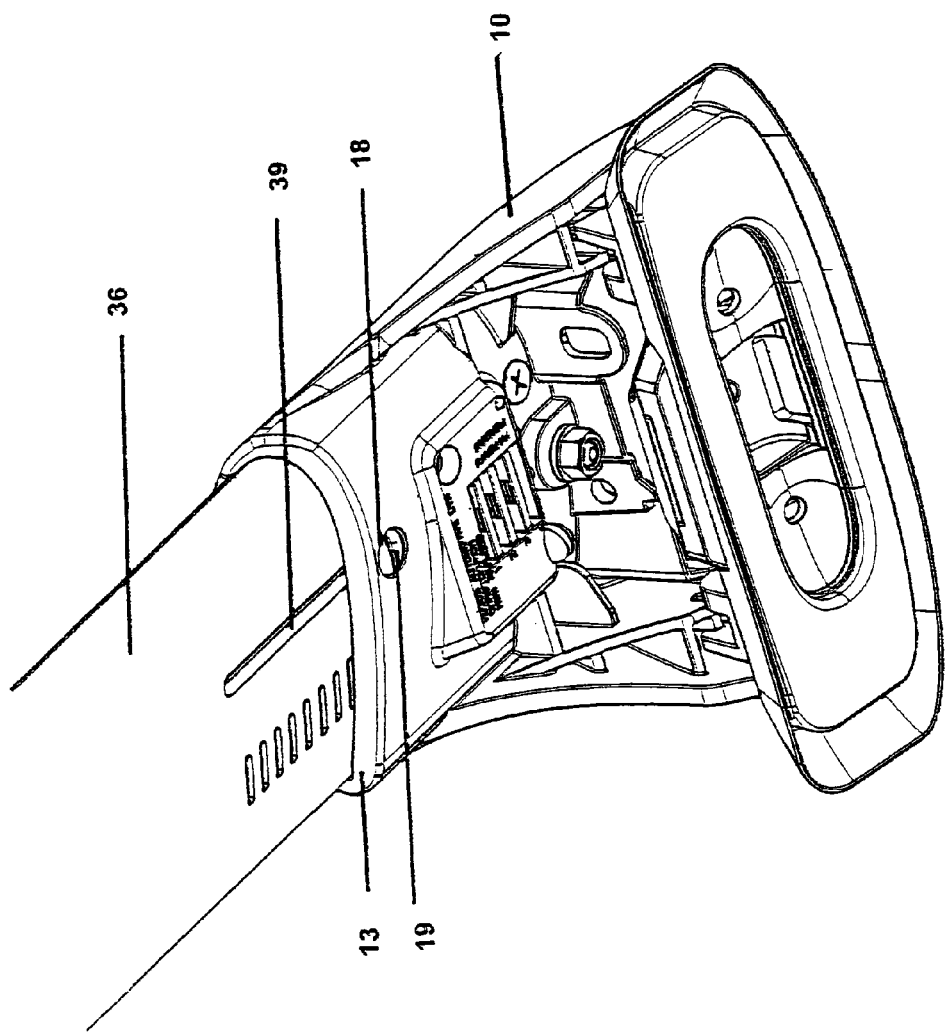
FIG. 8 is a perspective bottom view of a portion of a roof rack according to embodiments described herein.

To counteract the tendency of the inboard end of the leg to pivot toward the vehicle roof, the roof rack described herein provides a stabilising coupling, between the leg and the crossbar, in the form of a peg and channel arrangement. This arrangement is shown in FIG. 8.

In this arrangement, a peg receiving aperture 18 is positioned in the crossbar housing 13 near the inboard end of the crossbar housing. The lower surface 36 of the crossbar 30 includes a longitudinal slot or channel 39 that aligns with the peg receiving aperture 18 in the crossbar housing 30. When the crossbar 30 and extension member 50 are positioned in the crossbar housing, a peg 19 is pushed through the peg receiving aperture 18 and into the channel 39. The peg 19 includes a shaft that is shaped and dimensioned so that when the peg 19 is orientated in a first position, the shaft of the peg 19 can enter into and retract from the aperture 18 and channel 39, but when the peg is orientated to a second position, the shaft of the peg 19 cannot retract from the aperture 18 and channel 39. This feature of the shaft allows the peg to couple the leg 10 to the crossbar 30. In one form, the peg could include a coach bolt, for example, with both the round and the square portion of the coach bolt being able to enter through the aperture 18 in one orientation, but if the coach bolt is given a slight turn, the square portion prevents the coach bolt from retracting from the aperture 18.

In a preferred embodiment, the channel or slot 39 in the crossbar 30 extends to the end of the crossbar 30 such that the peg 19 can remain in the crossbar while the crossbar is slid through the housing 13.

After the effective length of the crossbar has been adjusted to the correct length to suit the roof of the relevant vehicle, a user may attach a leg cover to each leg of the roof rack.

Figure 9:
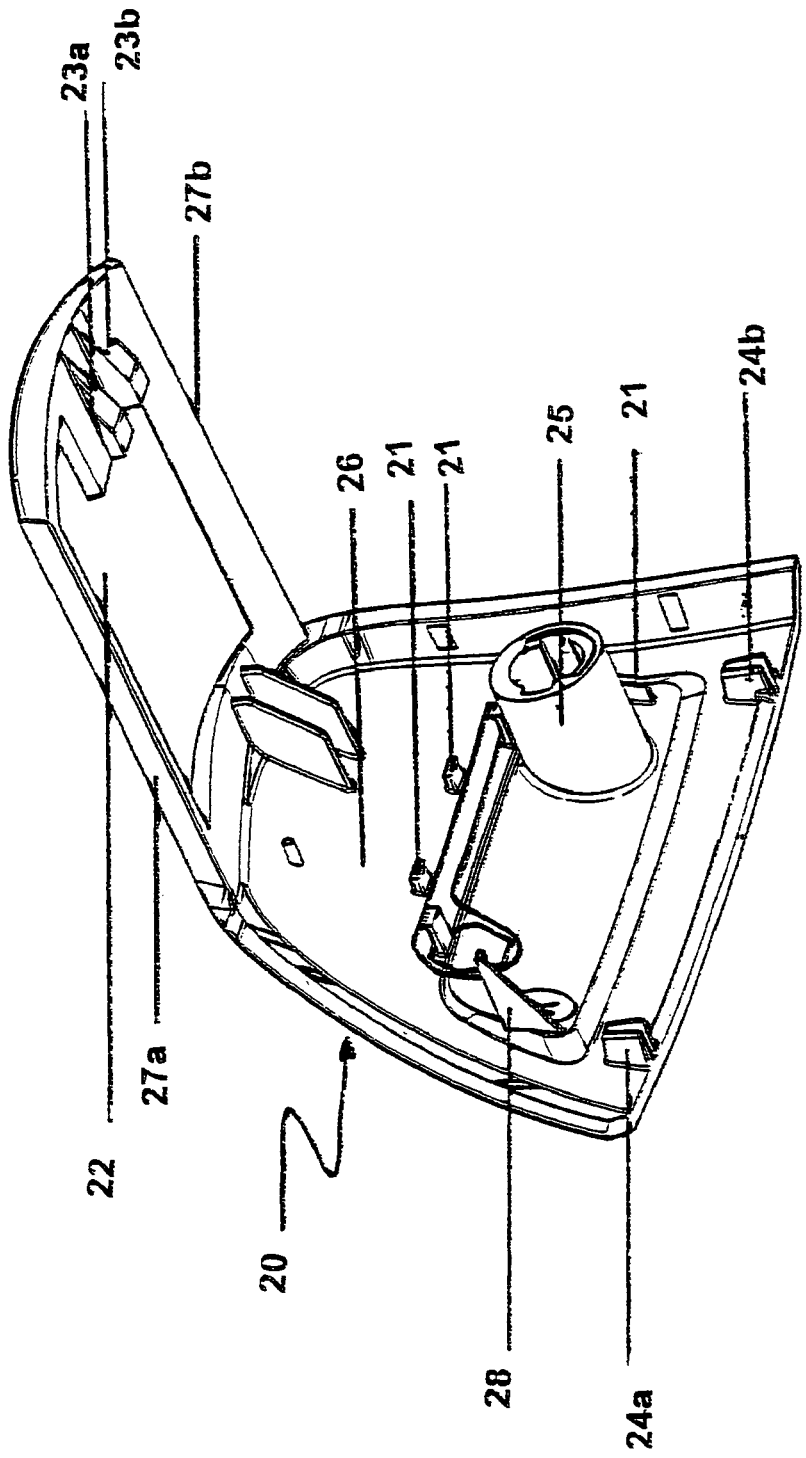
FIG. 9 is a perspective view of the inner face of a leg cover according to embodiments described herein.

As can be seen in FIG. 9, the leg cover includes a supporting body 26 with an upper portion, and a roof 22. The inside of the leg cover 20 has two lugs 24a, 24b that are shaped to mate with inner recesses 15a, 15b on the leg 10. However, it is envisaged that the leg cover may instead, or additionally, include lug receiving apertures for mating with lugs on the leg.

The roof 22 projects from the upper portion of the leg cover 20. The roof 22 has a first surface and a second surface. The second surface of the roof typically has the same profile as the upper surface 34 of the crossbar 30.

In particular, the profile of the second surface of the roof allows for the second surface to slide against the upper surface of the crossbar and achieve a snug fit between the upper surface of the crossbar and the second surface of the roof when the leg cover is attached to the crossbar.

The roof 22 of the leg cover 20 shown in FIG. 8 has side edges 27a, 27b that are profiled to slide against the lips 14a, 14b of the crossbar housing 13, when the roof 22 is slid over the crossbar to attach the leg cover 20 to the leg 10.

A pair of locating rails 23a, 23b project from the second surface of the roof 22.

The leg-cover 20 is attached to the crossbar 30 and leg 10 by sliding the roof 22 over the upper surface of one end of the crossbar 30 so that the opposing lips 38a, 38b of the crossbar are housed between the rails 23a, 23b and the second surface of the roof 22. By positioning the lips 38a, 38b within the rails 23a, 23b, the leg cover 20 is attached to the crossbar 30.

The inner face of the leg cover 20 may optionally include a protruding locating guide 28. The guide 28 is positioned on the cover to abut with a corresponding inner face, 17a or 17b, of the leg 10 when the cover 20 is attached to the leg 10.

The guide 28 helps a user to locate the cover 20 properly on the leg 10 and also helps to prevent the cover from skewing relative to the leg.

It is envisaged that two or more guides may be positioned on the inner face of the leg cover.

After positioning the lips 38a, 38b within the rails 23a, 23b, the cover 20 is then aligned with the leg 10 so that the guide 28 contacts a corresponding inner face of the leg. The cover is further slid towards the leg 10 until the lugs 24a, 24b and lug receiving apertures 15a, 15b, of the leg 10 and leg cover 20, mate with each other.

The roof 22 of the cover 20 and the crossbar housing 13 together form a cavity within which the end of the crossbar is housed.

A lock barrel can be positioned within a barrel housing 25 in the leg cover 20.

When the leg cover 20 is attached to a leg 10, the end of the lock barrel opposes the lock aperture 16 in the leg 10. The lock extends through the barrel housing 25 and through the lock aperture 16 located in the leg 10 to lock the cover 20 to the leg 10.

The lock prevents a user from dismantling and detaching the roof rack from the roof of a vehicle without the appropriate key.

The leg cover 20 may have one or more braces 21 to hold one or more tools, for example, a hex key and a spanner, within the leg cover 20. FIG. 9 shows a spanner being held to a leg cover 20 by braces 21.

While the roof rack described herein has been illustrated by the description of the embodiments thereof, and while the embodiments have been described in considerable detail, it is not the intention of the applicant to restrict or in any way limit the scope of the appended claims to such detail. For example, although the roof rack has been described with reference to a pair of extension arms, it is envisaged that the extension member could include a single extension arm, or three or more extension arms, provided that the crossbar included corresponding cavities in which to house the extension arm(s).

Furthermore, it is envisaged that the latch could be positioned on any extension arm and in such a position that the engaging foot may project from the upper surface or the lower surface of the extension arm. In such a form, the latch engagement sockets on the crossbar would be positioned on the crossbar to align 5 with the adjustment latch, as would be apparent to a person skilled in the art.

Additional advantages and modifications will readily appear to those skilled in the art. Therefore, the roof rack described herein, in its broader aspects, is not limited to the specific details of the representative apparatus and method, and illustrative examples shown and described. Accordingly, departures may be made from such details without departure from the scope of the applicant's general inventive concept.

I claim:

1. A flush bar roof rack comprising:
a pair of legs, each leg comprising a crossbar housing; and
a crossbar held and supported at each end by the crossbar housing of each leg;
wherein the roof rack comprises an extension means for adjusting the length of the roof rack between the legs;
wherein the extension means comprises an extension member having a support with an end face and a contact face; wherein at least one extension arm projects from the contact face of the support, the extension arm having a first surface and a second surface, and being adapted to fit within a cavity in the crossbar; and wherein the end face of the support has a profile that is the same shape and dimensions as the external profile of an end of the crossbar so that both the support and the crossbar can be held within the crossbar housing;
wherein the roof rack comprises a roof rack extension adjustment and locking mechanism to lock the roof rack in an extended position, the roof rack extension adjustment and locking mechanism including:
an adjustment latch located within a latch housing in an extension arm; and
a plurality of latch engagement sockets or slots located on the crossbar and aligned to engage with the adjustment latch; and
wherein the latch housing comprises a first portion and a second portion, separated by a partition wall therebetween; the first portion of the latch housing being defined by a rear surface nearest the extension member support, a forward surface nearest the distal end of the extension arm, and two opposing side surfaces; and wherein the second portion of the housing comprises a pair of opposing bearings, and a link retaining means that projects at least partially across the second portion of the latch housing at or near the first surface of the extension arm; and wherein the partition wall terminates below the link retaining means to form a link supporting end.

2. The roof rack according to claim 1, wherein the extension member comprises a first and second extension arm adapted to fit within a first and second cavity, respectively, in the crossbar, the extension arms substantially filling the cavities and being in sliding engagement with surfaces of the cavities.

3. The roof rack according to claim 1, wherein the roof rack comprises a maximum extension stop.

4. The roof rack according to claim 3, wherein the extension stop comprises a resilient catch located on the extension member for engagement with a locking means, comprising an aperture or recess, located on the crossbar.

5. The roof rack according to claim 4, wherein the resilient catch comprises a resilient finger having a lug projecting therefrom, the lug being adapted to engage with the locking means and the resilient finger being attached to, or integral with, an extension arm.

6. The roof rack according to claim 5, wherein the lug comprises a forward face, which faces toward the distal end of the extension arm;
and a rear face, which faces toward the extension member support; and wherein the forward face of the lug is sloped toward the resilient finger.

7. The roof rack according to claim 6, wherein the rear face of the lug is a blunt face.

8. The roof rack according to claim 1, wherein the roof rack comprises a coupling means to hold the crossbar to the leg, the coupling means comprising:
a peg receiving aperture formed in the inboard end of the crossbar housing;
a channel formed in the lower surface of the crossbar and aligning with the peg receiving aperture; and
a peg having a shaft that is dimensioned to engage with the channel and peg receiving aperture when the peg is in a first position and to disengage with the channel and peg receiving aperture when the peg is in a second position.

9. An extension member for a roof rack according to claim 1, wherein the extension member comprises a support with an end face and a contact face; wherein at least one extension arm projects from the contact face of the support, the extension arm having a first surface and a second surface, and being adapted to fit within a cavity of the crossbar; and wherein the end face of the support has a profile that is the same shape and dimensions as the external profile of an end of a roof rack crossbar, so that both the support and the crossbar can be held within a crossbar housing on a leg of a roof rack.

10. The roof rack according to claim 1, wherein a leg cover is attached to each leg of the roof rack, the leg cover comprising a body having an upper portion with a roof projecting therefrom, the roof comprising a first surface and a second surface, and wherein a pair of rails project from the second surface to engage with opposing lips within a crossbar.

11. The roof rack according to claim 10, wherein the leg cover has an inner face from which projects a locating guide.

12. The roof rack according to claim 1, wherein the adjustment latch comprises:
- a link having an L-shaped body comprising an actuating portion and a locating portion, the actuating portion comprising a toggle receiving aperture or recess; and the locating portion being perpendicular to the actuating portion;
- a toggle comprising a body having a base and an axle, wherein a shaft projects from the base, and wherein the body comprises an engaging foot projecting from the opposite side of the body to the shaft;
- a biasing means having a first end and a second end;
- wherein the actuating portion of the link is positioned between the supporting end of the partition wall and the link retaining means, and wherein the toggle receiving aperture, or recess, in the actuating portion is positioned within the second portion of the latch housing, the link being positioned so that the locating portion projects toward the second surface of the extension arm;
- wherein the toggle is positioned in the second portion of the latch housing, the toggle shaft engaging with the toggle receiving aperture, or recess, on the actuating portion, and the axle being supported by the opposing bearings; and
- wherein the biasing means is positioned in the first portion of the latch housing, the first end of the biasing means being operatively engaged with the locating portion to push the locating portion against the rearward face of the first portion of the latch housing, and the second end of the biasing means pushing against the partition wall.

13. The roof rack according to claim 12, wherein the biasing means is a compressed spring.

14. The roof rack according to claim 12, wherein the roof rack comprises a latch release mechanism that is inoperative engagement with the adjustment latch to disengage the adjustment latch from the latch engagement sockets.

15. The roof rack according to claim 14, wherein the latch release mechanism comprises a button in operative engagement with a shank, the shank being in operative engagement with the locating portion of the link to push the link toward the distal end of the extension arm.

16. The roof rack according to claim 15, wherein the locating portion of the link comprises a shank receiving aperture having a threaded annular surface and wherein the shank has a threaded end that interlocks with the threaded annular surface of the shank receiving aperture, and wherein the first end of the spring is held in position against the locating portion of the link by the shank.

* * * * *